(12) United States Patent
Hirano

(10) Patent No.: US 11,637,294 B2
(45) Date of Patent: Apr. 25, 2023

(54) METHOD FOR PRODUCING FUEL CELL SEPARATOR

(71) Applicant: TOYOTA JIDOSHA KABUSHIKI KAISHA, Toyota (JP)

(72) Inventor: Masaki Hirano, Tsushima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 929 days.

(21) Appl. No.: 16/410,073

(22) Filed: May 13, 2019

(65) Prior Publication Data

US 2019/0363373 A1    Nov. 28, 2019

(30) Foreign Application Priority Data

May 28, 2018    (JP) .............................. JP2018-101610

(51) Int. Cl.

| B21D 25/00 | (2006.01) |
|---|---|
| H01M 8/0223 | (2016.01) |
| B21D 22/20 | (2006.01) |
| H01M 8/0206 | (2016.01) |
| H01M 50/403 | (2021.01) |

(52) U.S. Cl.
CPC .......... *H01M 8/0223* (2013.01); *B21D 22/20* (2013.01); *B21D 25/00* (2013.01); *H01M 8/0206* (2013.01); *H01M 50/403* (2021.01)

(58) Field of Classification Search
CPC ............. H01M 8/0223; H01M 8/0206; H01M 50/403; H01M 50/463; H01M 2008/1095; B21D 22/20; B21D 25/00; Y02E 60/10; Y02E 60/50; Y02P 70/50
See application file for complete search history.

(56) References Cited

U.S. PATENT DOCUMENTS

| 2008/0255811 | A1* | 10/2008 | Sheng | ..................... G06F 30/23 703/1 |
|---|---|---|---|---|
| 2014/0272668 | A1 | 9/2014 | Nagoshi et al. | |
| 2017/0058382 | A1 | 3/2017 | Tsuru et al. | |

FOREIGN PATENT DOCUMENTS

| CN | 103959524 A | 7/2014 |
|---|---|---|
| JP | 5-329561 A | 12/1993 |
| JP | 2011-038166 A | 2/2011 |
| JP | 2015-155560 A | 8/2015 |
| JP | 2017-179565 A | 10/2017 |

* cited by examiner

*Primary Examiner* — Ryan J. Walters
(74) *Attorney, Agent, or Firm* — Sughrue Mion, PLLC

(57) ABSTRACT

Provided is a method for producing a fuel cell separator, capable of easily roughening the surface of a sheet-like metal substrate to become a fuel cell separator and thus reducing the contact resistance of the resulting fuel cell separator. Specifically, the method is a method for producing a fuel cell separator from a sheet-like metal substrate, including pulling the metal substrate at least in one direction to plastically deform the metal substrate, thereby increasing the arithmetic average roughness Ra of the surface of the metal substrate after being pulled compared to that before being pulled.

3 Claims, 8 Drawing Sheets

METHOD FOR PRODUCING FUEL CELL SEPARATOR

CROSS REFERENCE TO RELATED APPLICATIONS

The present application claims priority from Japanese patent application JP 2018-101610 filed on May 28, 2018, the content of which is hereby incorporated by reference into this application.

BACKGROUND

Technical Field

The present disclosure relates to a method for producing a fuel cell separator from a sheet-like metal substrate.

Background Art

A polymer electrolyte fuel cell that uses an electrolyte membrane can operate at low temperatures and is compact and lightweight. Therefore, the application of such a polymer electrolyte fuel cell to a movable object, such as an automobile, is considered. In particular, a fuel cell automobile having a polymer electrolyte fuel cell mounted thereon has been attracting social attention as an eco-car.

Such a polymer electrolyte fuel cell includes a plurality of stacked cells (i.e., unit cells) as basic units. Each cell includes a membrane electrode assembly having a pair of gas diffusion layers arranged on opposite sides thereof, and a pair of separators sandwiching them. The membrane electrode assembly has a structure in which an anode electrode and a cathode electrode are arranged on opposite sides of an electrolyte membrane that is an ion exchange membrane.

Each separator is a plate-shaped member including metal, which has excellent conductivity and gas impermeability, as the substrate. One surface side of the separator contacts the membrane electrode assembly, and the other surface side thereof contacts one surface side of an adjacent separator. Such a separator is a member that separates adjacent cells and also serves to allow current to flow through each cell. Therefore, it is important to reduce contact resistance between the separator and a counterpart member in contact with the separator.

In view of the foregoing, JP 2011-038166 A, for example, proposes performing an etching process on a metal substrate made of stainless steel to be used for a separator, thereby roughening the surface of the metal substrate. Accordingly, when the resulting roughened metal substrate is machined into a separator, a contact area between the separator and a counterpart member in contact with the separator is increased. Therefore, contact resistance between the two can be reduced. Besides, there is also known a method of performing abrasive blasting on the surface of a metal substrate to be used for a separator, thereby roughening the surface of the metal substrate.

SUMMARY

However, when etching process such as the one described in JP 2011-038166 A is performed, a large quantity of waste liquid is generated, thus requiring waste liquid treatment. Meanwhile, when abrasive blasting is performed, complex operations are required as a polishing agent should be uniformly blasted onto the surface of the metal substrate from a blasting gun.

The present disclosure has been made in view of the foregoing, and provides a method for producing a fuel cell separator, capable of easily roughening the surface of a sheet-like metal substrate to become a fuel cell separator and thus reducing the contact resistance of the resulting fuel cell separator.

Accordingly, a method for producing a fuel cell separator in accordance with the present disclosure is a method for producing a fuel cell separator from a sheet-like metal substrate, including pulling the metal substrate at least in one direction to plastically deform the metal substrate, thereby increasing the arithmetic average roughness Ra of the surface of the metal substrate after being pulled compared to that before being pulled.

According to the present disclosure, as the arithmetic average roughness Ra is increased as described above, the proportion of projections on the surface of the metal substrate after being pulled is increased as compared to that before being pulled. Therefore, in comparison with when the metal substrate before being pulled is used, the contact area rate between the metal substrate after being pulled and a counterpart member in contact with the metal substrate is increased. Therefore, if such a metal substrate is machined into a separator using stamping, contact resistance between the separator and its counterpart member can be reduced. Further, only pulling a metal substrate to become a separator at least in one direction can easily increase the arithmetic average roughness Ra of the surface of the resulting separator.

In an exemplary embodiment of the method for producing a fuel cell separator, the metal substrate includes two metal substrates, and the metal substrates are pulled so that, when pressure sensitive paper is sandwiched between the two pulled metal substrates and is pressed at a contact pressure of 1 MPa, provided that the pressed area of the pressure sensitive paper corresponds to the contact area of each metal substrate, the area rate of the contact area becomes greater than or equal to 10.0%. According to such an embodiment, pulling each metal substrate to achieve an area rate in such a range can effectively reduce contact resistance between a separator, which is obtained by machining the pulled metal substrate, and its counterpart member.

In another exemplary embodiment of the method for producing a fuel cell separator, metal of each metal substrate is titanium, and the thickness of the metal substrate before being pulled is less than or equal to 100 μm, and each metal substrate is pulled so that the length of the metal substrate after being pulled in the pulling direction is increased by 20% or more compared to that before being pulled.

According to such an embodiment, although a metal substrate made of titanium and having a thickness less than or equal to 100 μm is likely to deform when subjected to abrasive blasting, for example, only pulling such a metal substrate can impart desired surface roughness thereto, and the contact area rate of the resulting fuel cell separator can be made greater than or equal to 10.0%. Consequently, contact resistance between a separator, which is obtained by machining the pulled metal substrate, and its counterpart member can be reduced.

In further another exemplary embodiment of the method for producing a fuel cell separator of the present disclosure, metal of the metal substrate is stainless steel, and the thickness of the metal substrate before being pulled is less than or equal to 100 μm, and the metal substrate is pulled so that the length of the metal substrate after being pulled in the pulling direction is increased by 10% or more compared to that before being pulled.

According to such an embodiment, although a metal substrate made of stainless steel and having a thickness less than or equal to 100 μm is likely to deform when subjected to abrasive blasting, for example, only pulling such a metal substrate can impart desired surface roughness thereto, and the contact area rate of the resulting fuel cell separator can be made greater than or equal to 10.0%. Consequently, contact resistance between a separator, which is obtained by machining the pulled metal substrate, and its counterpart member can be reduced.

According to the present disclosure, the surface of a sheet-like metal substrate to become a fuel cell separator can be easily roughened so that the contact resistance of the resulting fuel cell separator can be reduced.

DETAILED DESCRIPTION

Figure 1:
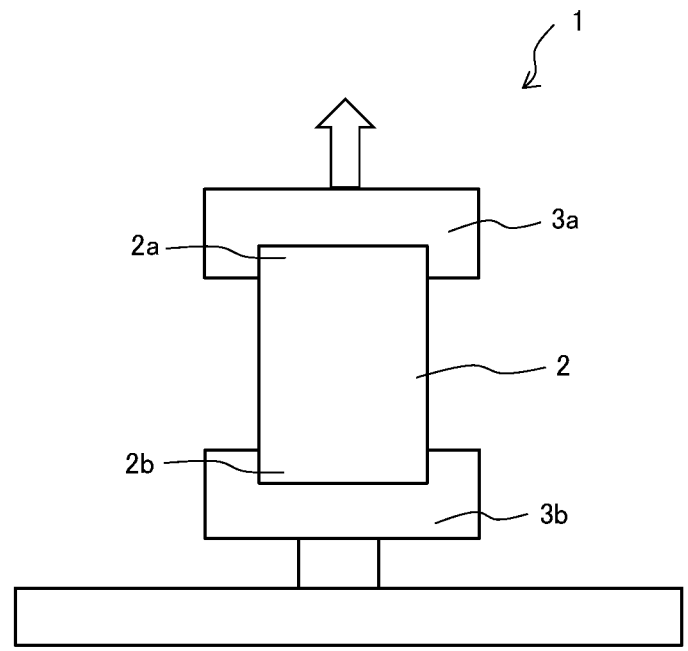
FIG. 1 is a schematic conceptual view illustrating a method for producing a fuel cell separator in accordance with this embodiment.

Hereinafter, embodiments of the present disclosure will be described with reference to FIG. 1. FIG. 1 is a schematic conceptual view illustrating a method for producing a fuel cell separator in accordance with this embodiment.

In the method for producing a fuel cell separator of this embodiment, a fuel cell separator is produced from a sheet-like metal substrate 2. The metal substrate 2 is not particularly limited as long as it is metal with excellent conductivity and gas impermeability. Examples of the metal substrate 2 include titanium and stainless steel. Herein, titanium is a titanium-based material containing titanium as a main component. Examples of titanium include pure titanium and titanium alloy. Examples of stainless steel include austenitic stainless steel, such as SUS 304 and SUS 316 (JIS standards).

The thickness of the metal substrate 2 may be in the range of 20 to 400 μm or less than or equal to 100 μm, for example. When the thickness of the metal substrate 2 is less than or equal to 100 μm, the thickness of the entire fuel cell can be reduced, and further, metal of the metal substrate 2 will easily flow plastically. Therefore, desired surface roughness can be easily imparted to the metal substrate 2 by the pulling described below.

When the metal substrate 2 is made of titanium, the arithmetic average roughness Ra of the surface of the metal substrate 2 before being pulled may be greater than or equal to 1.8 μm and less than or equal to 3.9 μm. Meanwhile, when the metal substrate 2 is made of stainless steel, the arithmetic average roughness Ra of the surface of the metal substrate 2 before being pulled may be greater than or equal to 1.5 μm and less than or equal to 2.9 μm. When such a range is satisfied, a favorable contact area rate of the metal substrate 2 can be secured by the pulling described below.

In this embodiment, such a metal substrate 2 is pulled at least in one direction so as to be plastically deformed, whereby the arithmetic average roughness Ra of the surface of the metal substrate 2 after being pulled is increased compared to that before being pulled. Specifically, using a tensioner 1 illustrated in FIG. 1, opposite ends 2a and 2b of the metal substrate 2 are gripped with a pair of gripping portions 3a and 3b of the tensioner 1. In such a state, while one gripping portion 3b is fixed, the other gripping portion 3a is moved in one direction so that the metal substrate 2 is pulled in the one direction.

Due to such pulling, the structure or the shape of crystals forming the metal substrate 2 emerges on the surface of the metal substrate 2, which results in an increased arithmetic average roughness Ra of the metal substrate 2. The one direction in which the metal substrate 2 is pulled is not particularly limited as long as the arithmetic average roughness Ra of the surface of the metal substrate 2 can be increased. For example, the metal substrate 2 may be pulled in a plurality of directions so as to be plastically deformed.

The arithmetic average roughness Ra of the surface of the metal substrate 2 after being pulled may be greater than or equal to 2.5 μm when the metal substrate 2 is titanium, and may be greater than or equal to 2.0 μm when the metal substrate 2 is stainless steel. If the arithmetic average roughness Ra is outside of such a range, a favorable contact area rate described below would be difficult to obtain.

In this embodiment, as described with reference to Examples below, pressure sensitive paper 4 is sandwiched between two metal substrates 2 and 2 that have been pulled, and is then pressed by a pair of pressing members 6 and 6 at a contact pressure of 1 MPa. At this time, provided that the pressed area of the pressure sensitive paper 4 is the area of contact between the pressure sensitive paper 4 and each of the metal substrates 2, the area rate of the contact area (i.e., contact area rate) may be greater than or equal to 10.0%.

Therefore, in this embodiment, each metal substrate 2 described with reference to FIG. 1 may be pulled so as to satisfy such an area rate. Pulling each metal substrate 2 so as to satisfy a contact area rate in such a range can effectively reduce contact resistance between a separator 13, which is obtained by machining the pulled metal substrate 2, and its counterpart member (i.e., another separator 13 or a gas diffusion layer 17 (see FIG. 3)).

In this embodiment, if metal of the metal substrate 2 is titanium and the thickness of the metal substrate 2 before being pulled is less than or equal to 100 μm, the metal substrate 2 may be pulled so that the length of the metal substrate 2 after being pulled in the pulling direction is increased by 20% or more compared to that before being pulled. Meanwhile, if metal of the metal substrate 2 is stainless steel and the thickness of the metal substrate 2 before being pulled is less than or equal to 100 μm, the metal substrate 2 may be pulled so that the length of the metal substrate 2 after being pulled in the pulling direction is increased by 10% or more compared to that before being pulled. It should be noted that the percentage of the increased length of the metal substrate 2 herein is defined as a "pulled amount" in Examples described below.

If the thickness of the metal substrate 2 is less than or equal to 100 μm, the metal substrate is likely to deform when subjected to abrasive blasting or the like, for example. However, in this embodiment, only pulling such a metal substrate 2 can impart desired surface roughness thereto and thus can set the contact area rate of the separator 13, which is obtained by machining the pulled metal substrate 2, to 10.0% or more.

Figure 3:
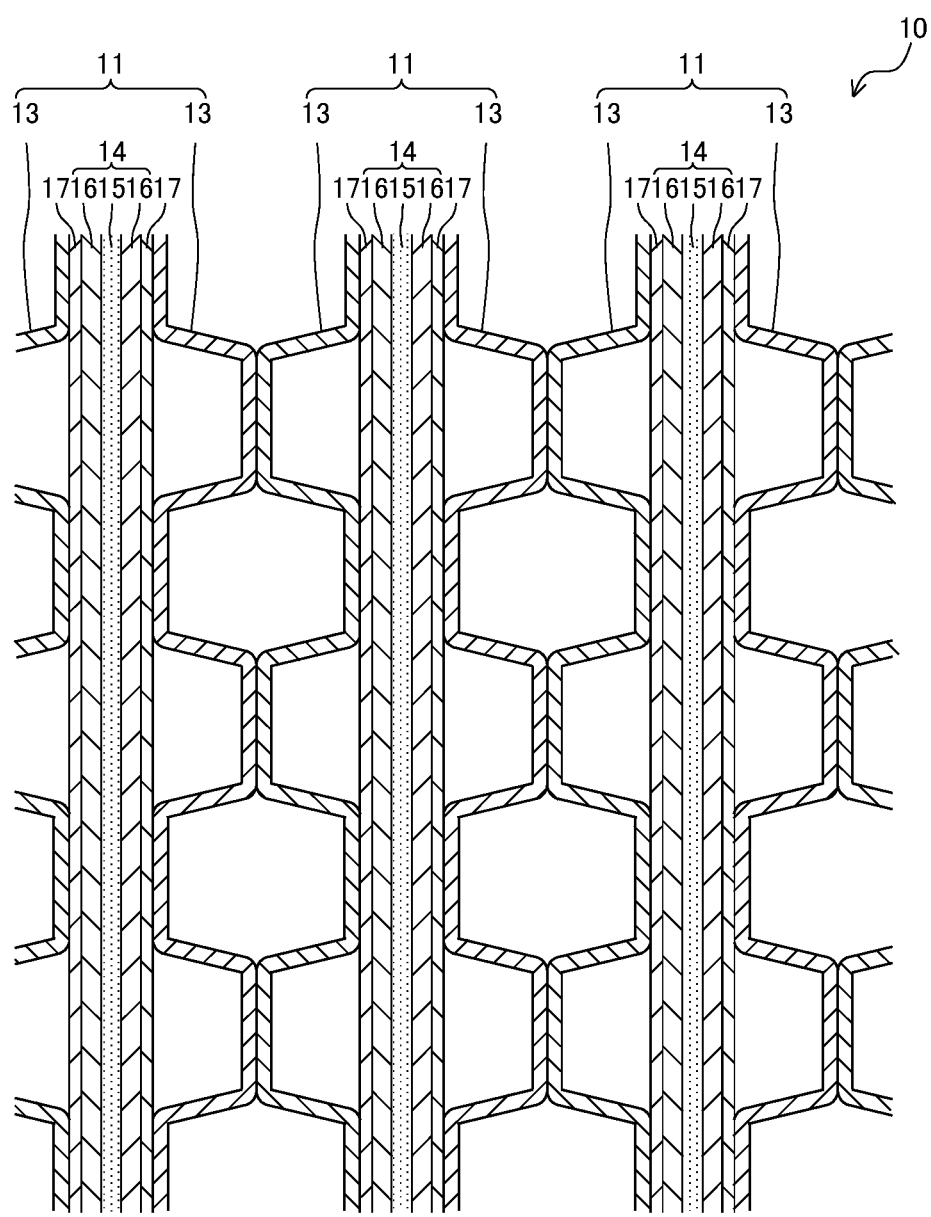
FIG. 3 is a cross-sectional view of the primary portion of a polymer electrolyte fuel cell.

The pulled metal substrate 2 is machined into the shape of the separator 13 of the fuel cell 10 illustrated in FIG. 3 through press forming and stamping. Such a separator 13 is incorporated in the fuel cell 10 described below. Specifically, the fuel cell 10 illustrated in FIG. 3 has a plurality of stacked cells 11 (i.e., unit cells) as basic units. Each cell 11 includes a membrane electrode assembly 14 having gas diffusion layers 17 and 17 arranged on opposite sides thereof, and a pair of separators 13 and 13 sandwiching them. The membrane electrode assembly 14 has a structure in which an anode electrode 16 and a cathode electrode 16 are arranged on opposite sides of an electrolyte membrane 15 that is an ion exchange membrane. In the fuel cell 10 illustrated in FIG. 3, the separator 13 has the shape of waves that form trapezoids with equal legs, and one surface side of each wave abuts one of the gas diffusion layers 17, and the other surface side thereof abuts one surface side of another separator 13. Therefore, the gas diffusion layer 17 and the adjacent separator 13 are counterpart members that the separator 13 is in contact with.

According to this embodiment, the metal substrate 2 is pulled at least in one direction so that the arithmetic average roughness Ra of the surface of metal substrate 2 after being pulled is increased as compared to that before being pulled. Accordingly, the proportion of projections on the surface of the metal substrate 2 after being pulled is increased compared to that before being pulled. Therefore, as compared to when the metal substrate 2 before being pulled is used, when the metal substrate 2, which has been pulled and machined into the separator 13, is used, contact resistance between the separator 13 and its counterpart member can be reduced.

In addition, according to this embodiment, only pulling the metal substrate 2 at least in one direction can increase the arithmetic average roughness Ra thereof. Therefore, the metal substrate 2 can be easily subjected to surface treatment. Such surface treatment can be easily performed using the tensioner 1, such as Autograph that is commonly used. Further, for example, since there is no generation of waste liquid, which would otherwise be generated if the surface of the metal substrate 2 is etched, the labor of waste liquid treatment can be eliminated. Further, complex operations required for abrasive blasting, such as preparation of slurry containing a polishing agent for grinding the surface of the metal substrate 2, and preparation of a blasting gun for blasting the polishing agent, can be eliminated.

According to this embodiment, the contact area rate is set greater than or equal to 10.0% so that contact resistance between the separator 13 and its counterpart member can be effectively reduced. In addition, according to this embodiment, if metal of the metal substrate 2 is titanium and the thickness of the metal substrate 2 is less than or equal to 100 μm, an arithmetic average roughness Ra greater than or equal to 2.5 μm can be obtained by pulling the metal substrate 2 by an amount greater than or equal to 20%. Therefore, a contact area rate greater than or equal to 10.0% can be achieved. Meanwhile, if metal of the metal substrate 2 is stainless steel and the thickness of the metal substrate 2 is less than or equal to 100 μm, an arithmetic average roughness Ra greater than or equal to 2.0 μm can be obtained by pulling the metal substrate 2 by an amount greater than or equal 10%. Therefore, a contact area rate greater than or equal to 10.0% can be achieved.

Examples

Hereinafter, the present disclosure will be described by way of Examples.

[Production of Test Pieces 1 to 5]
<Test Piece 1>

As the sheet-like metal substrate, a pure titanium plate with a size of 60 mm×120 mm and a thickness of 100 μm was prepared. The prepared pure titanium plate was pulled in one direction using Autograph (produced by SHIMADZU CORPORATION) so as to attain a pulled amount of 10%. The resulting plate was used as Test Piece 1 corresponding to a fuel cell separator. It should be noted that "to attain a pulled amount of 10%" means that the length of the metal substrate after being pulled in the pulling direction is increased by 10% compared to that before being pulled, and the pulled amount is calculated from Equation 1 below.

$$\text{Pulled amount (\%)} = (L-Lo)/Lo \times 100 \quad \text{(Equation 1)}$$

Herein, L indicates the length of the metal substrate after being pulled in the pulling direction, and Lo indicates that before being pulled (i.e., natural length).

<Test Pieces 2 to 4>

Test Pieces 2 to 4 were produced similarly to Test Piece 1. Test Pieces 2 to 4 differ from Test Piece 1 in the pulled amount. Specifically, the pulled amounts of Test Pieces 2 to 4 were 20%, 30%, and 40%, respectively.

<Test Piece 5>

Test Piece 5 was produced similarly to Test Piece 1. Test Piece 5 differs from Test Piece 1 in that the prepared pure titanium plate was not pulled.

[Measurement of Arithmetic Average Roughness Ra]

A test piece with a predetermined size was cut out of each of Test Pieces 1 to 5 produced so that the arithmetic average roughness Ra of the surface of each test piece was measured. The measurement was conducted in accordance with JIS B0601-2001 using a laser microscope (VK-X250; produced by KEYENCE CORPORATION). The arithmetic average roughness Ra was measured along a direction orthogonal to the pulling direction. Table 1 shows the results.

TABLE 1

| | Pulled Amount (%) | Arithmetic Average Roughness Ra (μm) |
|---|---|---|
| Test Piece 1 | 10 | 2.1 |
| Test Piece 2 | 20 | 2.5 |
| Test Piece 3 | 30 | 2.9 |
| Test Piece 4 | 40 | 3.9 |
| Test Piece 5 | 0 | 1.8 |

[Result 1]

Table 1 can confirm that the arithmetic average roughness Ra of the surface of each test piece increased with an increase in the pulled amount. This is considered to be because the surface roughness of each test piece has increased as a result of the shape of the titanium structure having emerged on the surface of the test piece due to the pulling.

Next, a test piece with a predetermined size was cut out of each of Test Pieces 1 to 5, and among them, two test pieces (i.e., a first test piece and a second test piece) were laid one on top of the other such that their surfaces were in contact with each other, whereby Samples 1-1 to 1-5 were produced. Table 2 shows a combination of the test pieces of each sample produced, and the pulled amount and the arithmetic average roughness Ra thereof. As shown in Table 2, Sample 1-1 has a combination of a test piece pulled by 0% (before being pulled) and a test piece pulled by 10%. Meanwhile, each of Samples 1-2 to 1-5 has a combination of a second test piece with a pulled amount fixed to 30% and a first test piece with a pulled amount varied in the range of 10 to 40%. Sample 1-1 corresponds to Comparative Example and Samples 1-2 to 1-5 correspond to Examples. The contact area rate and the contact resistance of each sample were confirmed as described below.

[Measurement of Contact Area Rate]

Figure 2:
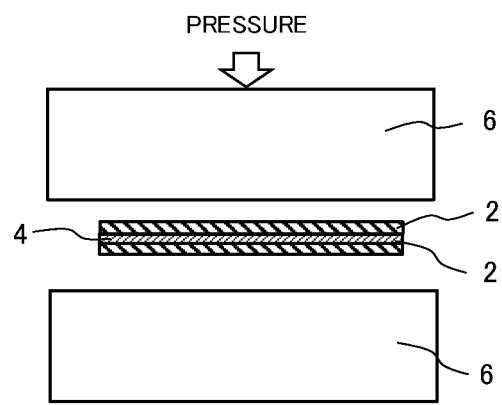
FIG. 2 is a schematic conceptual view illustrating a method for measuring a contact area rate.

As illustrated in FIG. 2, pressure sensitive paper (produced by Fujifilm Corporation, for ultralow pressure) was sandwiched between the two overlaid test pieces of each sample, and the sample having the test pieces sandwiching the pressure sensitive paper therebetween was pressed using pressing jigs (i.e., a pair of pressing members) at a pressure (i.e., contact pressure) of 1 MPa for 10 seconds. After being pressed, the pressure sensitive paper sandwiched between the two test pieces was removed. The area of a portion of the removed pressure sensitive paper, which has a changed color, corresponds to the area of the pressed portion of the pressure sensitive paper. Therefore, the areas of the pressed portion and unpressed portion were binarized using image processing software ("WinROOF" produced by MITANI CORPORATION). The contact area rate was calculated from Equation 2 shown below using the area of the pressed portion of the pressure sensitive paper as the area of contact between the pressure sensitive paper and each test piece. Table 2 shows the results.

Contact area rate (%)=(area of the pressed portion)/(area of the entire pressure sensitive paper)×100   (Equation 2)

[Measurement of Contact Resistance]

Figure 4:
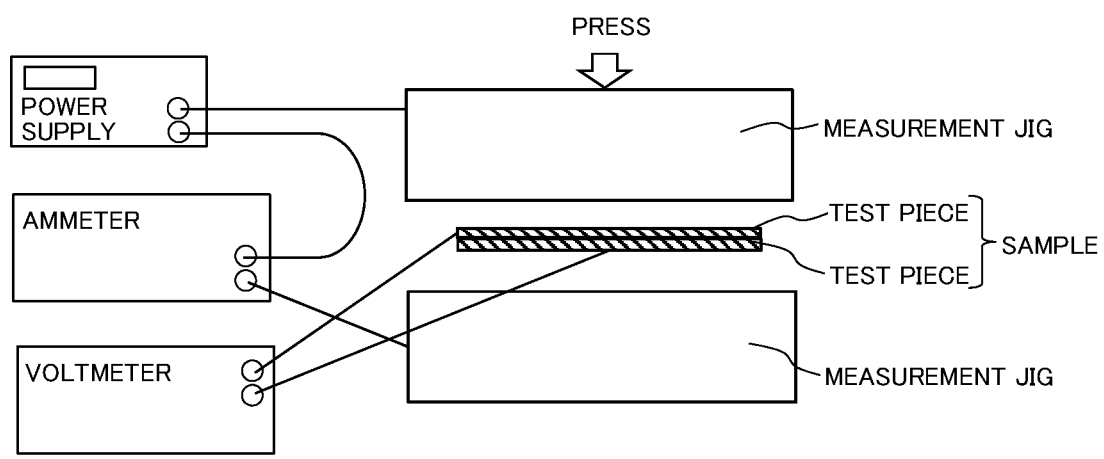
FIG. 4 is a schematic diagram of a contact resistance measuring device.

As shown in FIG. 4, a constant load (1 MPa) was applied to each sample having two test pieces overlaid one on top of the other such that their surfaces were in contact with each other. In such a state, current was allowed to flow through the sample from a power supply while being adjusted with an ammeter such that the current flowing through the sample became 1 A. Then, voltage applied to the sample was measured with a voltmeter, and contact resistance between the two test pieces was calculated. Table 2 shows the results.

TABLE 2

| | Combination of Test Pieces | | First Test Piece | | Second Test Piece | | | |
| | | | Pulled | | Pulled | | Contact | Contact |
| | First Test Piece | Second Test Piece | Amount (%) | Ra (μm) | Amount (%) | Ra (μm) | Area Rate (%) | Resistance (mΩ·cm$^2$) |
|---|---|---|---|---|---|---|---|---|
| Sample 1-1 | Test Piece 5 | Test Piece 1 | 0 | 1.8 | 10 | 2.1 | 6.6 | 2.8 |
| Sample 1-2 | Test Piece 1 | Test Piece 3 | 10 | 2.1 | 30 | 2.9 | 7.5 | 2.8 |
| Sample 1-3 | Test Piece 2 | Test Piece 3 | 20 | 2.5 | 30 | 2.9 | 11.4 | 2.4 |
| Sample 1-4 | Test Piece 3 | Test Piece 3 | 30 | 2.9 | 30 | 2.9 | 10.3 | 1.8 |
| Sample 1-5 | Test Piece 4 | Test Piece 3 | 40 | 3.9 | 30 | 2.9 | 16.8 | 1.7 |

[Result 2]

When the arithmetic average roughness Ra of a test piece is large, as seen in the first test pieces of Samples 1-2 to 1-5 (Examples), the contact area rate was higher and the contact resistance was lower in comparison with the first test piece before being pulled of Sample 1-1 (Comparative Example) shown in Table 2. This is considered to be because when the arithmetic average roughness Ra increased, the heights of projections formed on the surface also increased, and thus, the proportion of the projections formed on the surface increased, and consequently, the contact area rates of Samples 1-2 to 1-5 became higher and the contact resistance thereof became lower. It should be noted that the contact resistance values of Sample 1-1 and Sample 1-2 shown in Table 2 are the same (2.8 mΩ·cm$^2$), but the contact area rate of Sample 1-2 is higher than that of Sample 1-1. Therefore, it is speculated that the contact resistance value of Sample 1-2 is the same as that of Sample 1-1 due to variations in measurement and therefore, if a separator is produced under the conditions of Sample 1-2, the contact resistance of the separator will tend to become lower than that of Sample 1-1.

Accordingly, it is considered that pulling a metal substrate can increase the arithmetic average roughness Ra thereof and consequently, the contact area rates of Samples 1-2 to 1-5 increased. In particular, if a metal substrate made of titanium is used for each of Samples 1-2 to 1-5, the contact resistance of each of Samples 1-2 to 1-5 can be sufficiently reduced if it is pulled by 20% or more.

[Verification Tests]

Based on the foregoing results, verification tests for the contact area rate and the contact resistance were conducted. Specifically, a plurality of test pieces with predetermined sizes were cut out of Test Pieces 1 to 5, and two of the test pieces (i.e., a first test piece and a second test piece) were appropriately combined, whereby a total of 15 samples were produced. Then, the contact area rate and the contact resistance of each sample were measured.

Figure 5:
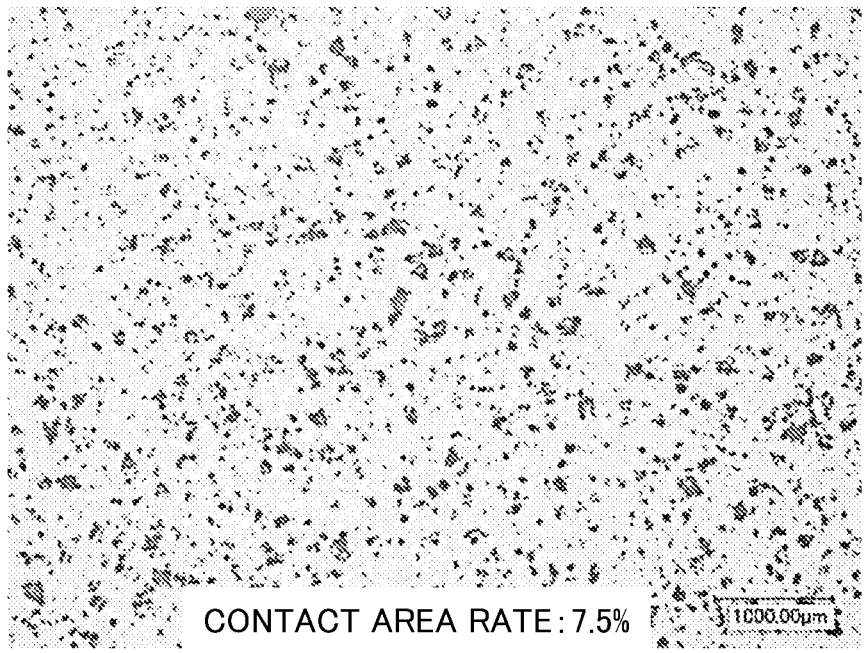
FIG. 5 is a photograph of pressure sensitive paper after first and second test pieces each pulled by 0% were pressed.
Figure 6:
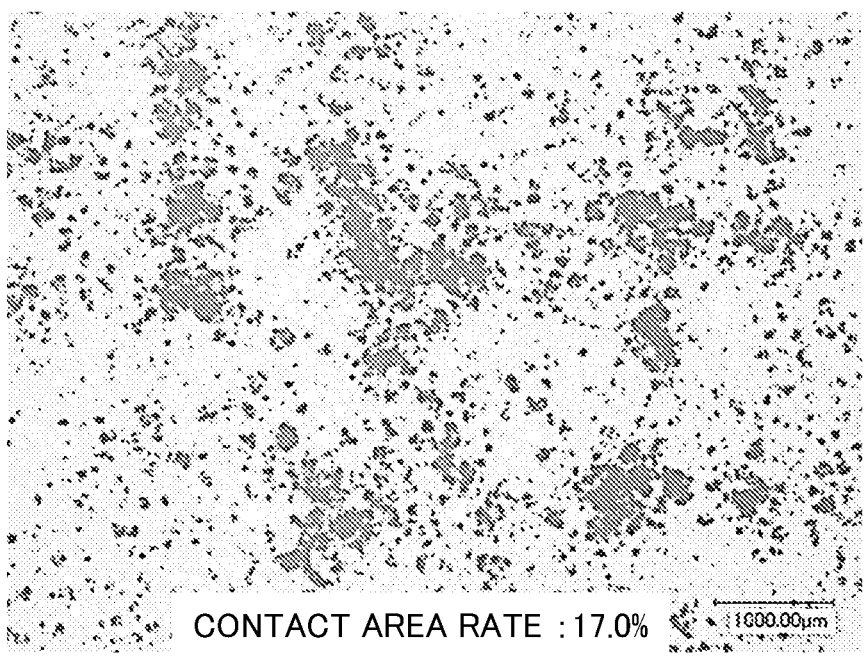
FIG. 6 is a photograph of pressure sensitive paper after first and second test pieces each pulled by 40% were pressed.

FIGS. 5 and 6 show photographs of pressure sensitive paper after being pressed when, among the samples whose contact area rates were measured, a sample, which has a combination of test pieces pulled by 0% (Test Pieces 5) as the first and second test pieces, and a sample, which has a combination of test pieces pulled by 40% (Test Pieces 4) as the first and second test pieces, were used, respectively.

Figure 7A:
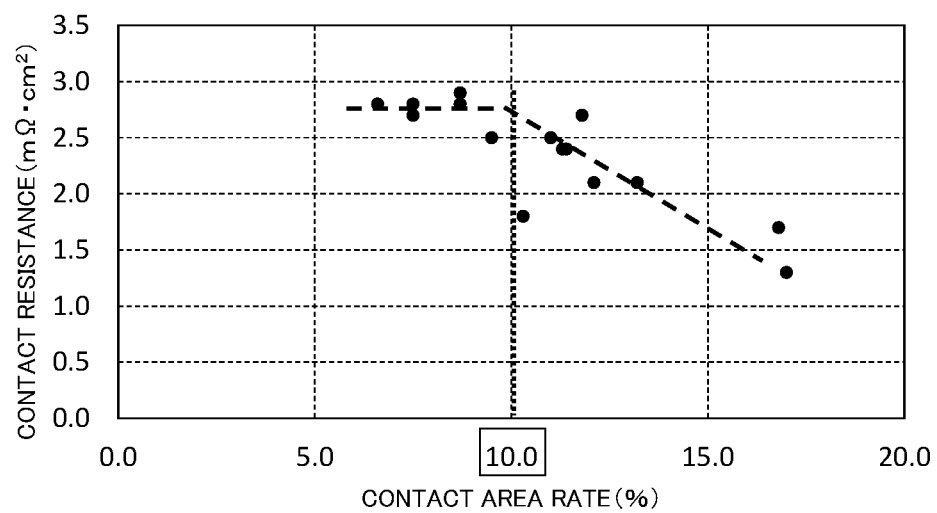
FIG. 7A is a graph representing the relationship between the contact area rate (%) and the contact resistance (mΩ·cm$^2$) of samples used for verification tests.
Figure 7B:
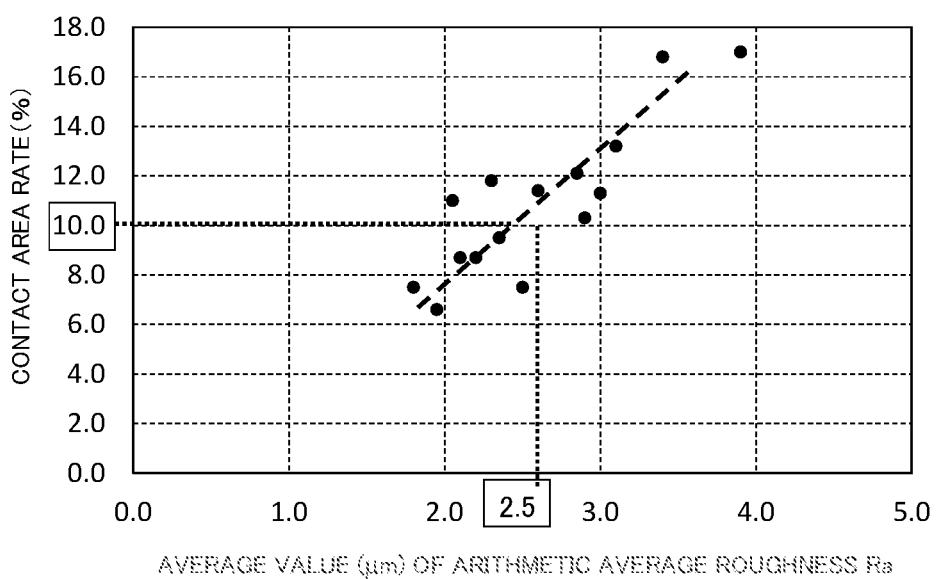
FIG. 7B is a graph representing the relationship between the average value (μm) of the arithmetic average roughness Ra and the contact area rate (%) of the samples used for the verification tests.
Figure 7C:
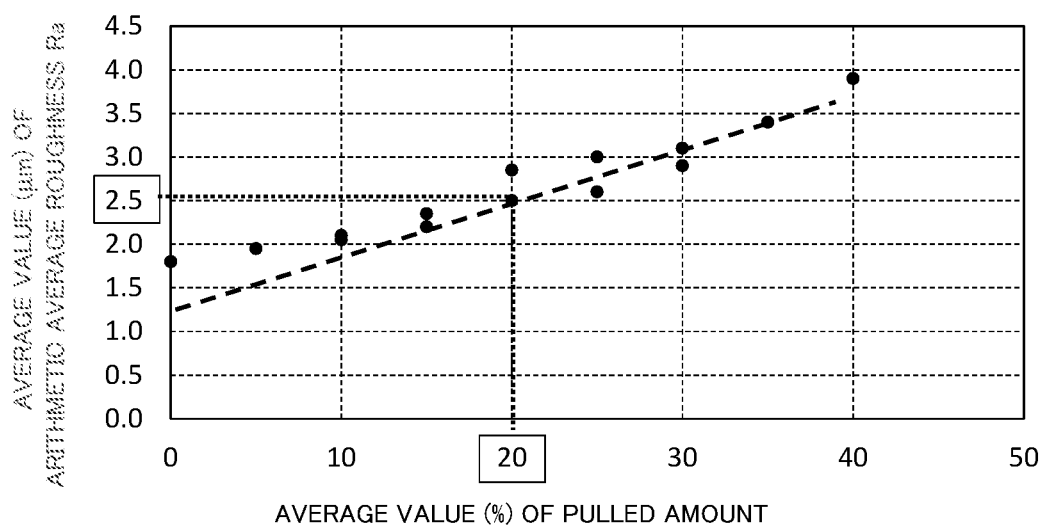
FIG. 7C is a graph representing the relationship between the average value (%) of the pulled amount and the average value (μm) of the arithmetic average roughness Ra of the samples used for the verification tests.
Figure 7D:
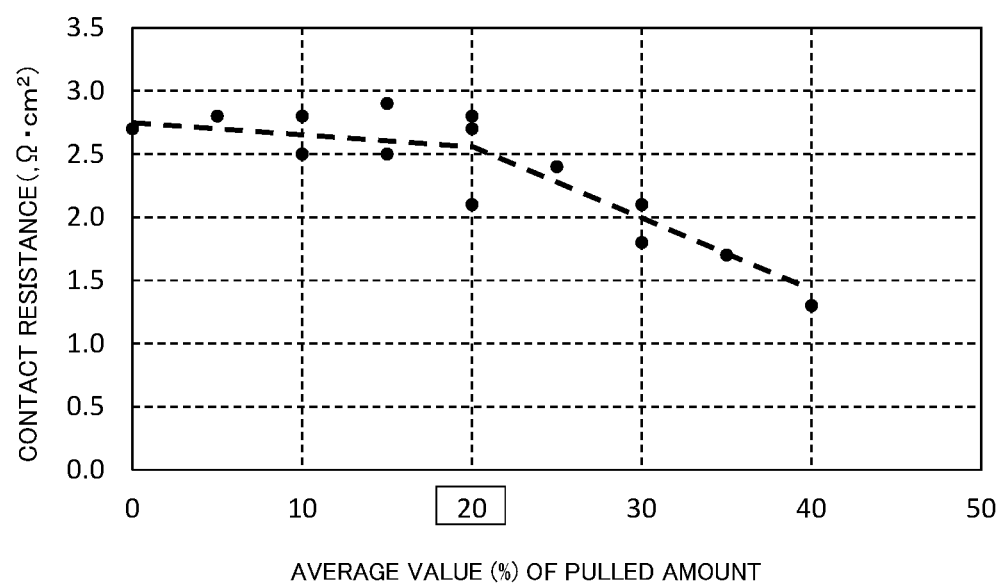
FIG. 7D is a graph representing the relationship between the average value (%) of the pulled amount and the contact resistance (mΩ·cm$^2$) of the samples used for the verification tests.

Further, FIG. 7A is a graph representing the relationship between the contact area rate (%) and the contact resistance (mΩ·cm$^2$) of the samples used for the verification tests. FIG. 7B is a graph representing the relationship between the average value (μm) of the arithmetic average roughness Ra and the contact area rate (%) of the samples used for the verification tests. FIG. 7C is a graph representing the relationship between the average value (%) of the pulled amount and the average value (μm) of the arithmetic average roughness Ra of the samples used for the verification tests. FIG. 7D is a graph representing the relationship between the average value (%) of the pulled amount and the contact resistance (mΩ·cm$^2$) of the samples used for the verification tests. It should be noted that the average values of the pulled amount and the arithmetic average roughness Ra of each sample are those of the first test piece and the second test piece, and are calculated on the basis of the pulled amounts and the arithmetic average roughness Ra of Test Pieces 1 to 5 shown in Table 1.

[Result 3]

As seen in FIGS. 5 and 6, in comparison with when the sample having the first and the second test pieces, which have been both pulled by 0% was used, when the sample having the first and second test pieces, which have been both pulled by 40%, is used, the pressure sensitive paper is found to have more portions that changed in color (contacted portions). Regarding the contact area rate and the contact resistance of such samples, the sample having the first and second test pieces, which have been both pulled by 0%, is found to have a contact area rate of 7.5% and a contact resistance of 2.7 mΩ·cm$^2$, while the sample having the first and second test pieces, which have been both pulled by 40%, is found to have a contact area rate of 17.0% and a contact resistance of 1.3 mΩ·cm$^2$.

As seen in FIG. 7A, at a contact area rate greater than or equal to 10.0%, the contact resistance decreases with an increase in the contact area rate. In addition, as shown in FIG. 7B, the contact area rate increases with an increase in the average value of the arithmetic average roughness Ra. As seen in FIG. 7B, it is considered that setting the average value of the arithmetic average roughness Ra to greater than or equal to 2.5 μm can secure a contact area rate greater than or equal to 10.0%.

As shown in FIG. 7C, the average value of the arithmetic average roughness Ra increases with an increase in the average value of the pulled amount. As seen in FIG. 7C, it is considered that setting the average value of the pulled amount to greater than or equal to 20% can secure an average value of the arithmetic average roughness Ra that is greater than or equal to 2.5 μm. In addition, as seen in FIG. 7D, it is considered that setting the average value of the pulled amount to greater than or equal to 20% can effectively reduce contact resistance.

To conclude the results of the aforementioned verification tests, the contact area rate may be set to greater than or equal to 10% to reduce contact resistance. Each sample is made up of two test pieces. Therefore, to obtain a favorable contact area rate, the arithmetic average roughness Ra of at least one of the test pieces may be set to greater than or equal to 2.5 μm. To obtain arithmetic average roughness Ra in such a range, at least one of the test pieces may be pulled by 20% or more. The results of such verification tests are considered to show substantially the same tendencies as the results of Samples 1-1 to 1-5 (see Table 2).

<Test Piece 6>

Test Piece 6 was produced similarly to Test Piece 1. Test Piece 6 differs from Test Piece 1 in that an austenitic stainless steel (JIS standards: SUS 304) plate was prepared as the sheet-like metal substrate. The shape and the thickness of Test Piece 6 were the same as those of Test Piece 1.

<Test Pieces 7 to 9>

Test Pieces 7 to 9 were produced similarly to Test Piece 6. Test Pieces 7 to 9 differ from Test Piece 6 in the pulled amount. Specifically, the pulled amounts of Test Pieces 7 to 9 were 20%, 30%, and 40%, respectively.

<Test Piece 10>

Test Piece 10 was produced similarly to Test Piece 6. Test Piece 10 differs from Test Piece 6 in that the prepared austenitic stainless steel plate was not pulled.

[Measurement of Arithmetic Average Roughness Ra]

A test piece with a predetermined size was cut out of each of Test Pieces 6 to 10 produced so that the arithmetic average roughness Ra thereof was measured as described above. Table 3 shows the results.

TABLE 3

|  | Pulled Amount (%) | Arithmetic Average Roughness Ra (μm) |
| --- | --- | --- |
| Test Piece 6 | 10 | 2.0 |
| Test Piece 7 | 20 | 2.6 |
| Test Piece 8 | 30 | 2.7 |
| Test Piece 9 | 40 | 2.9 |
| Test Piece 10 | 0 | 1.5 |

[Result 4]

Table 3 can confirm that the arithmetic average roughness Ra of the surface of each test piece increased with an increase in the pulled amount, similarly to when titanium was used as the metallic material. This is considered to be because the surface roughness of each test piece has increased (i.e., the proportion of projections on the surface has increased) due to the pulling, because of the shape of the structure of stainless steel.

Figure 8A:
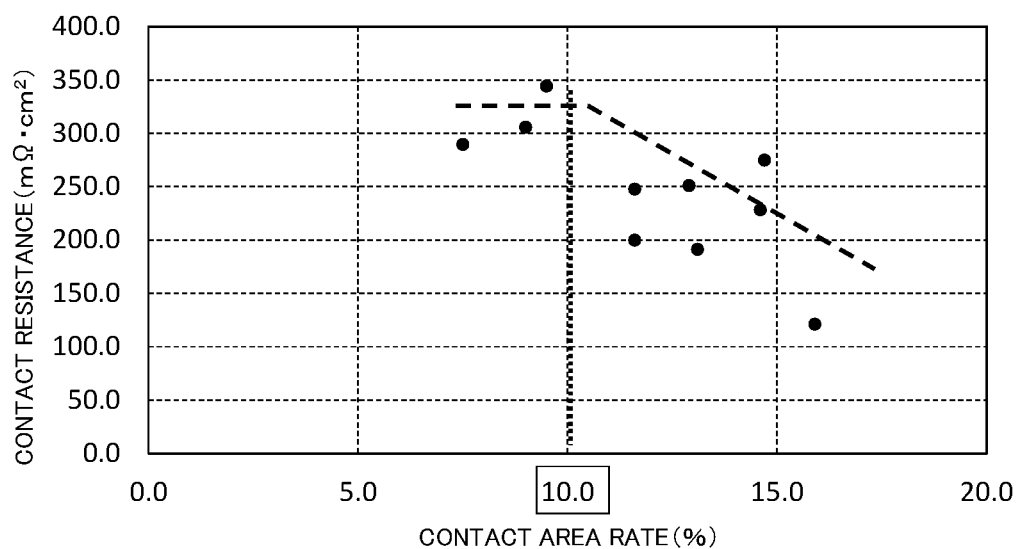
FIG. 8A is a graph representing the relationship between the contact area rate (%) and the contact resistance (mΩ·cm$^2$) of each sample having a combination of Test Pieces 6 to 10.
Figure 8B:
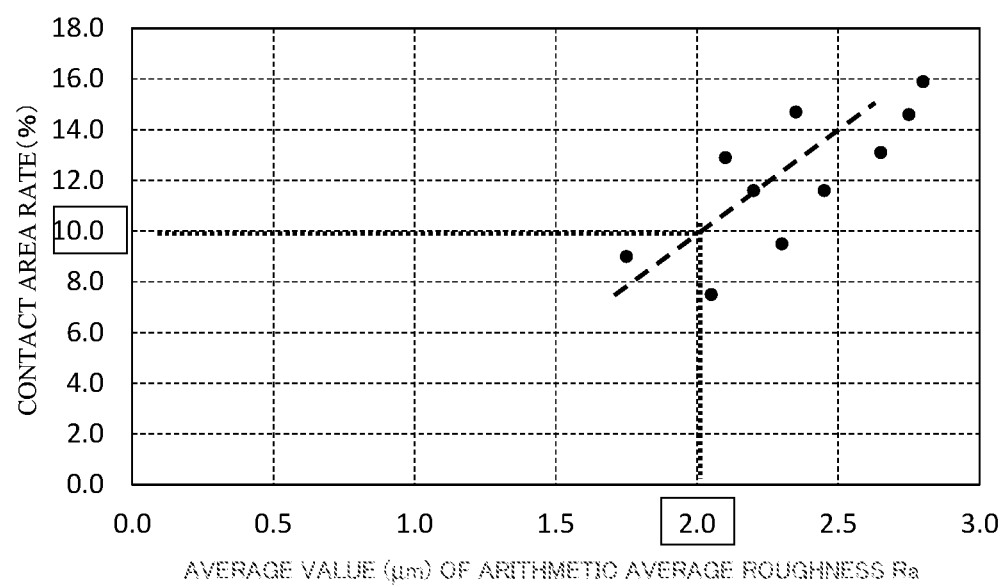
FIG. 8B is a graph representing the relationship between the average value (μm) of the arithmetic average roughness Ra and the contact area rate (%) of each sample having a combination of Test Pieces 6 to 10.
Figure 8C:
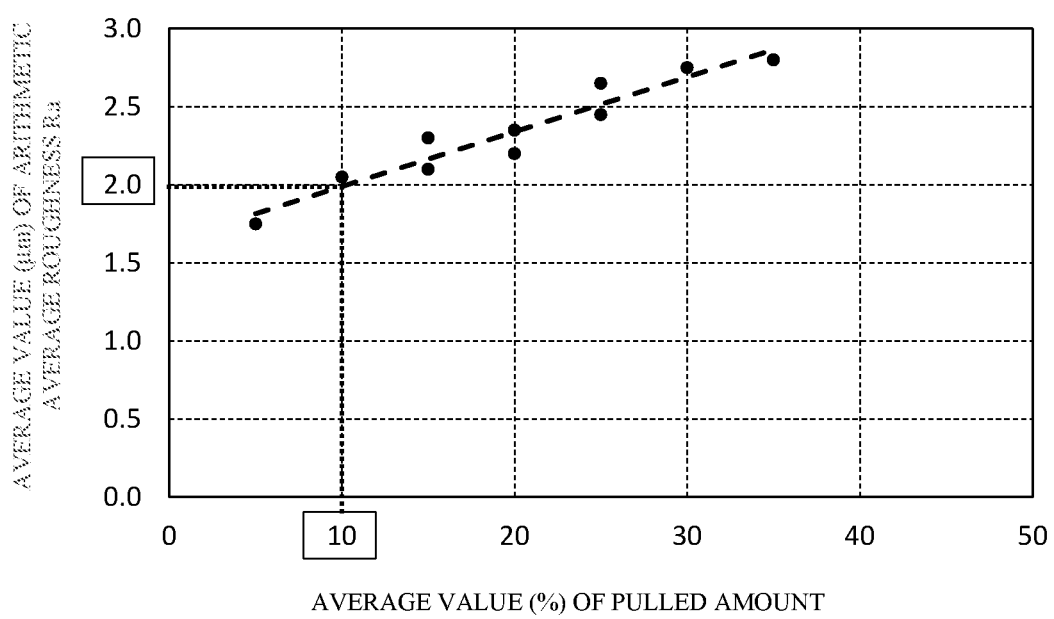
FIG. 8C is a graph representing the relationship between the average value (%) of the pulled amount and the average value (μm) of the arithmetic average roughness Ra of each sample having a combination of Test Pieces 6 to 10.

Next, test pieces were cut out of Test Pieces 6 to 10, and two of the test pieces (i.e., a first test piece and a second test piece) were combined by being laid one on top of the other such that their surfaces were in contact with each other, whereby (a total of 10) samples were produced. Then, the contact resistance and the contact area rate of each sample were measured as described above. FIGS. 8A to 8C show the results.

FIG. 8A is a graph representing the relationship between the contact area rate (%) and the contact resistance (mΩ·cm$^2$) of each sample having a combination of Test Pieces 6 to 10. FIG. 8B is a graph representing the relationship between the average value (μm) of the arithmetic average roughness Ra and the contact area rate (%) of each sample having a combination of Test Pieces 6 to 10. FIG. 8C is a graph representing the relationship between the average value (%) of the pulled amount and the average value (μm) of the arithmetic average roughness Ra of each sample having a combination of Test Pieces 6 to 10. It should be noted that the average values of the pulled amount and the arithmetic average roughness Ra of each sample are those of the first test piece and the second test piece, and are calculated on the basis of the pulled amounts and the arithmetic average roughness Ra of Test Pieces 6 to 10 shown in Table 3.

[Result 5]

As seen in FIG. 8A, at a contact area rate greater than or equal to 10.0%, the contact resistance decreases with an increase in the contact area rate. As seen in FIG. 8B, the contact area rate increases with an increase in the average value of the arithmetic average roughness Ra. This is considered to be because the proportion of projections on the surface of each test piece has increased due to the pulling as described above. It is also considered that setting the average value of the arithmetic average roughness Ra to greater than or equal to 2.0 μm can secure a contact area rate greater than or equal to 10.0%. FIG. 8C can confirm that the average value of the arithmetic average roughness Ra increases with an increase in the average value of the pulled amount, and setting the average value of the pulled amount to greater than or equal to 10% can secure an average value of the arithmetic average roughness Ra that is greater than or equal to 2.0 μm.

To conclude the results of FIGS. 8A to 8C, the contact area rate may be set to greater than or equal to 10% to reduce contact resistance. To obtain such a favorable contact area rate, the arithmetic average roughness Ra of at least one of the test pieces may be set to greater than or equal to 2.0 μm, and in such a case, at least one of the test pieces may be pulled by 10% or more.

It was found that in comparison with a metal substrate made of titanium, a metal substrate made of stainless steel has a larger arithmetic average roughness Ra at which the contact area rate becomes greater than or equal to 10%. This is because since stainless steel is harder than titanium, the shape of the metal substrate made of stainless steel is more stable and thus, a contact pressure of a contact portion can be more easily secured with such a metal substrate.

Although an embodiment of the present disclosure has been described in detail, the present disclosure is not particularly limited and various changes in design can be made within the spirit and scope of the present disclosure recited in the claims.

DESCRIPTION OF SYMBOLS

2 Sheet-like metal substrate
4 Pressure sensitive paper

What is claimed is:

1. A method for producing a pair of fuel cell separators, comprising:
    pulling a first sheet-like metal substrate at least in one direction to plastically deform the first metal substrate, thereby increasing an arithmetic average roughness Ra of a surface of the first metal substrate after being pulled compared to that before being pulled, wherein the arithmetic average roughness Ra of the first metal substrate after being pulled is 2.0 μm to 2.9 μm; and
    pulling a second sheet-like metal substrate at least in one direction to plastically deform the second metal substrate, thereby increasing an arithmetic average roughness Ra of a surface of the second metal substrate after being pulled compared to that before being pulled, wherein the arithmetic average roughness Ra of the second metal substrate after being pulled is 2.0 μm to 2.9 μm,
    wherein the each metal substrate is pulled so that, when pressure sensitive paper is sandwiched between the two metal substrates and is pressed at a contact pressure of 1 MPa, provided that a pressed area of the pressure sensitive paper corresponds to a contact area of each metal substrate, an area rate of the contact area becomes greater than or equal to 10.0%,
    a metal of each metal substrate is stainless steel, and a thickness of each metal substrate before being pulled is less than or equal to 100 μm, and
    each metal substrate is pulled so that a length of each metal substrate after being pulled in a pulling direction is increased by 10% or more compared to that before being pulled.

2. The method for producing a pair of fuel cell separators according to claim 1, further comprising:
    machining each metal substrate into a shape of a fuel cell separator through press forming and/or stamping.

3. A method for producing a fuel cell separator, comprising:
    pulling a sheet-like metal substrate at least in one direction to plastically deform the metal substrate, thereby increasing an arithmetic average roughness Ra of a surface of the metal substrate after being pulled compared to that before being pulled, and
    machining the metal substrate into a shape of the separator through press forming and/or stamping,
    wherein the metal substrate is stainless steel, and a thickness of the metal substrate before being pulled is less than or equal to 100 μm,
    the metal substrate is pulled so that a length of the metal substrate after being pulled in a pulling direction is increased by 10% or more compared to that before being pulled, and
    the arithmetic average roughness Ra of the metal substrate after being pulled is 2.0 μm to 2.9 μm.

* * * * *